United States Patent
Busbridge et al.

(10) Patent No.: US 12,272,261 B2
(45) Date of Patent: Apr. 8, 2025

(54) HIGHLIGHTING READING BASED ON ADAPTIVE PREDICTION

(71) Applicant: Apple Inc., Cupertino, CA (US)

(72) Inventors: Daniel W. Busbridge, Letchworth Garden (GB); Jason Ramapuram, Cambridge (GB); Russell Y. Webb, Cohasset, MA (US); Paul G. Puskarich, London (GB)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/874,181

(22) Filed: Jul. 26, 2022

(65) Prior Publication Data

US 2023/0087611 A1    Mar. 23, 2023

Related U.S. Application Data

(60) Provisional application No. 63/247,192, filed on Sep. 22, 2021.

(51) Int. Cl.
| | | |
|---|---|---|
| *G09B 17/00* | (2006.01) | |
| *G06F 40/109* | (2020.01) | |
| *G10L 15/06* | (2013.01) | |
| *G10L 15/197* | (2013.01) | |
| *G10L 15/22* | (2006.01) | |

(52) U.S. Cl.
CPC ......... *G09B 17/003* (2013.01); *G06F 40/109* (2020.01); *G10L 15/063* (2013.01); *G10L 15/197* (2013.01); *G10L 15/22* (2013.01)

(58) Field of Classification Search
CPC ... G09B 17/003; G06F 40/109; G10L 15/063; G10L 15/197; G10L 15/22
See application file for complete search history.

(56) References Cited

U.S. PATENT DOCUMENTS

| | | | | |
|---|---|---|---|---|
| 5,768,586 | A  * | 6/1998 | Zweben | G06Q 10/10 713/100 |
| 6,077,085 | A  * | 6/2000 | Parry | G09B 7/04 434/118 |
| 8,036,896 | B2 * | 10/2011 | Adams, Jr. | G10L 15/30 704/270.1 |
| 9,424,834 | B2 * | 8/2016 | Simmons | G09B 17/02 |
| 10,067,938 | B2 * | 9/2018 | Bellegarda | G06F 40/289 |
| 11,037,551 | B2 * | 6/2021 | Aleksic | G10L 15/07 |
| 11,216,510 | B2 * | 1/2022 | Jiang | G06N 3/02 |
| 11,425,064 | B2 * | 8/2022 | Ball | G06F 40/44 |
| 11,551,004 | B2 * | 1/2023 | Wohlwend | G06N 3/08 |
| 11,620,103 | B2 * | 4/2023 | Graham | G06F 3/04883 715/727 |
| 11,669,686 | B2 * | 6/2023 | Osuala | G06F 40/30 704/9 |
| 11,675,608 | B2 * | 6/2023 | Carrigan | G10L 15/07 713/1 |
| 11,675,963 | B2 * | 6/2023 | Agarwal | G06F 40/103 704/2 |

(Continued)

*Primary Examiner* — Xuan M Thai
*Assistant Examiner* — Sadaruz Zaman
(74) *Attorney, Agent, or Firm* — BAKERHOSTETLER

(57) ABSTRACT

A method is provided that includes predicting, using a language model, one or more words from a first set of words expected to be difficult for a reader, and providing the first set of words for display to the reader. The predicted one or more words in the first set of words are displayed differently from non-predicted words in the first set of words.

20 Claims, 5 Drawing Sheets

(56) References Cited

U.S. PATENT DOCUMENTS

| | | | |
|---|---|---|---|
| 11,710,373 B2* | 7/2023 | Meltzer | G07F 17/3248 |
| | | | 705/66 |
| 11,755,273 B2* | 9/2023 | Graham | H04S 7/308 |
| | | | 700/94 |
| 11,792,161 B2* | 10/2023 | Altmann | H04L 63/0254 |
| | | | 726/13 |
| 11,960,615 B2* | 4/2024 | Ma | G06F 21/6209 |
| 12,067,900 B2* | 8/2024 | Meltzer | G06F 40/106 |
| 2008/0021721 A1* | 1/2008 | Jones | G06Q 50/2057 |
| | | | 434/350 |
| 2009/0202969 A1* | 8/2009 | Beauchamp | G06N 5/02 |
| | | | 434/362 |
| 2009/0311657 A1* | 12/2009 | Dodelson | G09B 7/08 |
| | | | 434/350 |
| 2012/0221968 A1* | 8/2012 | Patterson | G06F 40/134 |
| | | | 715/776 |
| 2013/0224718 A1* | 8/2013 | Woodward | G09B 7/08 |
| | | | 434/350 |
| 2016/0364992 A1* | 12/2016 | Krishnamurthy | G09B 5/06 |
| 2023/0014775 A1* | 1/2023 | Dotan-Cohen | |
| | | | G06Q 10/063114 |
| 2023/0066796 A1* | 3/2023 | Khlystik | G06F 9/453 |
| 2023/0087611 A1* | 3/2023 | Busbridge | G06F 40/109 |

\* cited by examiner

"Here!" cried Alice, quite forgetting in the <u>flurry</u> of the moment how large she had grown in the last few minutes, and she jumped up in such a hurry that she tipped over the jury-box with the edge of her skirt, upsetting all the jurymen on to the heads of the crowd below, and there they lay sprawling about, reminding her very much of a globe of <u>goldfish</u> she had accidentally upset the week before.

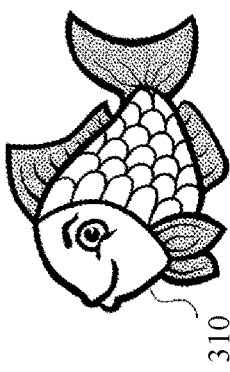

*FIG. 3*

HIGHLIGHTING READING BASED ON ADAPTIVE PREDICTION

CROSS-REFERENCE TO RELATED APPLICATIONS

This application claims the benefit of U.S. Provisional Patent Application No. 63/247,192, entitled "HIGHLIGHTING READING BASED ON ADAPTIVE PREDICTION", filed Sep. 22, 2021, the entirety of which is incorporated herein by reference.

TECHNICAL FIELD

The present description relates generally to electronic reading applications including, for example, electronic reading applications with highlighting based on adaptive prediction.

BACKGROUND

Electronic reading applications allow readers to consume various forms of content including books, magazine articles, web pages, etc. using an electronic device.

BRIEF DESCRIPTION OF THE DRAWINGS

Certain features of the subject technology are set forth in the appended claims. However, for purpose of explanation, several embodiments of the subject technology are set forth in the following figures.

FIG. 3 depicts a set of words with examples of highlighting according to aspects of the subject technology.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Electronic reading applications allow readers to consume various forms of content on an electronic device. An advantage to reading content using an electronic reading application is the ability to modify how the text is presented for display to the reader. For example, the application may allow the text to be enlarged, presented in different colors and/or boldness, etc. The subject technology proposes to use this capability to highlight certain words in content being read according to the reading level of the reader to draw the reader's focus to those words. The words may be highlighted because they are expected to be difficult for the reader to read based on the reader's reading level, or they may be difficult words that the reader is already familiar with.

The subject technology proposes to use a language model that is initially trained based on the reading level or age of the reader. Portions of the content being read by the user are applied to the language model to identify words in those portions that are expected to be difficult for the reader to read, for example. When presenting the content for display to the reader, the identified words are highlighted to draw the reader's focus to those identified words. As the reader reads portion of the content, the language model is progressively updated based on what the reader has read so far to improve the identification of words in subsequent portions of the content.

Figure 1:
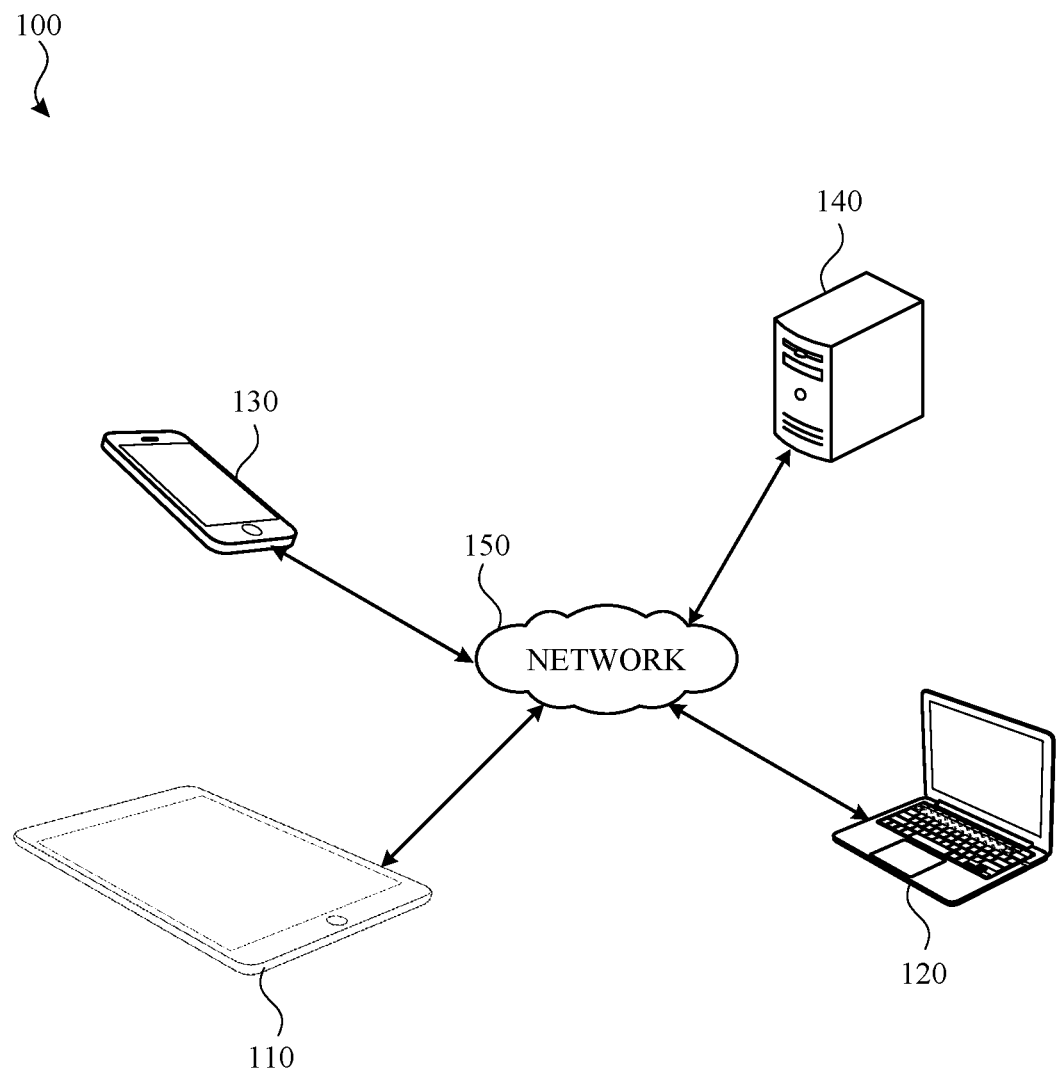
FIG. 1 illustrates an example network environment in which the subject technology may operate in accordance with one or more implementations.

FIG. 1 illustrates an example network environment 100 in which the subject technology may operate in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As illustrated in FIG. 1, network environment 100 includes electronic devices 110, 120, and 130, server 140, and network 150. In one or more implementations, network 150 may communicatively (directly or indirectly) couple electronic devices 110, 120, and 130 and server 140. In one or more implementations, network 150 may include one or more different network devices/network medium and/or may utilize one or more different wireless and/or wired network technologies, such as Ethernet, optical, Wi-Fi, Bluetooth, Zigbee, Powerline over Ethernet, coaxial, Ethernet, Z-Wave, cellular, or generally any wireless and/or wired network technology that may communicatively couple two or more devices. In one or more implementations, network 150 may be an interconnected network of devices that may include, and/or may be communicatively coupled to, the Internet. For explanatory purposes, network environment 100 is illustrated in FIG. 1 as including electronic devices 110, 120, and 130 and server 140; however, network environment 100 may include any number of electronic devices and any number of servers.

FIG. 1 illustrates electronic device 110 as a tablet device, electronic device 120 as a laptop computer, and electronic device 130 as smartphone. The subject technology is not limited to these types or numbers of electronic devices. For example, any of electronic devices 110, 120, and 130 may be a portable computing device such as a laptop computer, a smartphone, a set top box including a digital media player, a tablet device, a wearable device such as a smartwatch or a band, or any other appropriate device that is capable of executing client applications, providing access to the client applications via a graphical user interface, and includes and/or is communicatively coupled to, for example, one or more wired or wireless interfaces, such as WLAN radios, cellular radios, Bluetooth radios, Zigbee radios, near field communication (NFC) radios, and/or other wireless radios.

Server 140 represents one or more computing devices that are configured to provide services to users via client applications being executed on electronic devices 105-115. For example, server 140 may provide a reading service through which users may access and read content on an electronic device. The subject technology is not limited to this type of service. For example, server 140 may provide access to various types of content including, but not limited to, books, magazine articles, websites, documents, multi-media files, etc.

Figure 2:
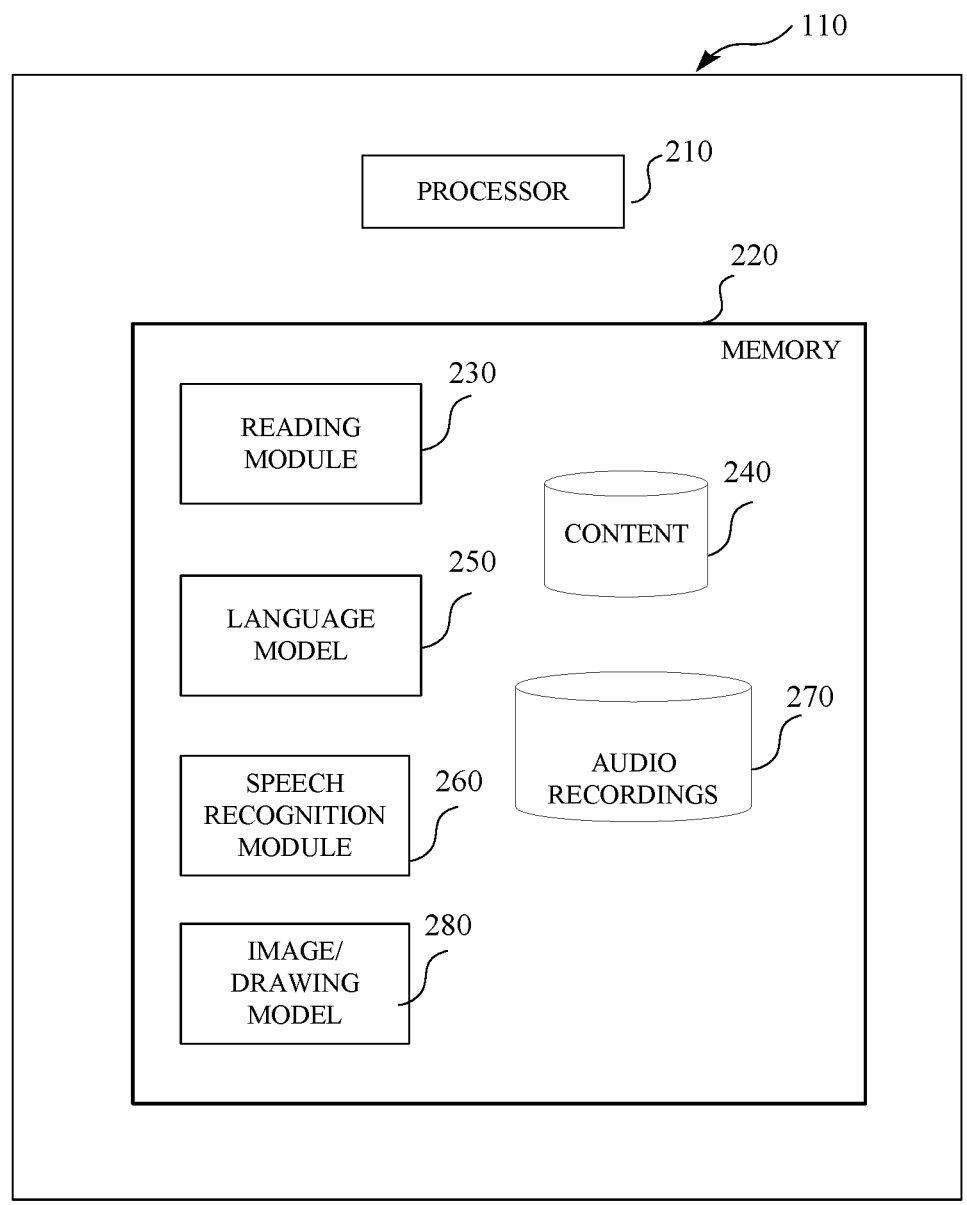
FIG. 2 is a block diagram illustrating components of an electronic device in accordance with one or more implementations of the subject technology.

FIG. 2 is a block diagram illustrating components of an electronic device in accordance with one or more implementations of the subject technology. While FIG. 2 depicts components for electronic device 110, FIG. 2 can correspond to any of electronic devices 110, 120, and 130 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

In the example depicted in FIG. 2, electronic device 110 includes processor 210 and memory 220. Processor 210 may include suitable logic, circuitry, and/or code that enable processing data and/or controlling operations of electronic device 110. In this regard, processor 210 may be enabled to provide control signals to various other components of electronic device 110. Processor 210 may also control transfers of data between various portions of electronic device 110. Additionally, the processor 210 may enable implementation of an operating system or otherwise execute code to manage operations of electronic device 110.

Processor 210 or one or more portions thereof, may be implemented in software (e.g., instructions, subroutines, code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Memory 220 may include suitable logic, circuitry, and/or code that enable storage of various types of information such as received data, generated data, code, and/or configuration information. Memory 220 may include, for example, random access memory (RAM), read-only memory (ROM), flash memory, and/or magnetic storage. As depicted in FIG. 2, memory 220 contains reading module 230, content 240, language model 250, speech recognition module 260, audio recordings 270, and image/drawing model 280. The subject technology is not limited to these components both in number and type, and may be implemented using more components or fewer components than are depicted in FIG. 2.

According to aspects of the subject technology, reading module 230 comprises a computer program having one or more sequences of instructions or code together with associated data and settings. Upon executing the instructions or code, one or more processes are initiated to provide content 240 for display to a reader using the electronic device. Content 240 may include, but is not limited to, books, magazines, documents, websites, etc. Reading module 230 may be configured to vary how content 240 is displayed to the reader. For example, one or more words may be displayed in a different font, font size, color, boldness, highlighting, underline, etc. than other words in the displayed content. As will be discussed in further detail below, variation in how certain words are displayed may be used to highlight different words to the reader based on expected difficulty or familiarity with the word for the reader.

According to aspects of the subject technology, language model 250 comprises a computer program having one or more sequences of instructions or code together with associated data and settings. Upon executing the instructions or code, one or more processes are initiated to provide a machine learning model trained to identify words for highlighting from a set of words. Language model 250 may be trained initially using a training set of words corresponding to an age of an expected reader or to a grade level of the expected reader. Based upon an input word, language model 250 may be trained to output a likelihood value representative of an expected difficulty of reading the word for the reader. Words may be considered difficult for a particular reading level based on frequency with which the words are used in the language (e.g., English), the length of the words, a mismatch between the spelling and the pronunciation of the words, words used in surprising ways, etc. The subject technology is not limited to these examples of factors used to determine the difficulty of words for a reader; other factors may be used without departing from the scope of the subject technology.

According to aspects of the subject technology, language model 250 may receive a token stream comprising K tokens ([token1][token2] . . . [tokenK]) and process the tokens to generate outputs ([output1][output2] . . . [outputK]) where the outputs may be likelihood values for each token or values that are provided to another model to compute likelihood values. The tokens may be raw words from a set of words determined by a tokenizer. The tokenizer may form splits for the tokens on spaces and punctuation in the set of words. Alternatively, a universal tokenizer may be used that determines tokens using byte-pair encodings. In this case, output values would be given per byte-pair and would then need to be recomputed using a merging rule from mapping the byte-pairs back into full words based on the initial byte-pair transformation. Special instruction tokens also may be provided to the language model to tell it when to expect certain things. For example, instruction tokens might include [begin sentence], [end sentence], [next page], [reading age], etc. The special instruction tokens may be hidden to the user but provided to the language model to give additional context of what is being seen by the reader or context about the reader. The subject technology is not limited to the token examples described above and may be implemented using other types of tokenizers.

As noted above, the input to language model 250 may be a token stream comprising K tokens. The size of K determines the context window for language model 250. The context window determines how many tokens on either side of a particular token the language model should consider when computing the output for the particular token. On one extreme, K could be set to include the entire set of words (e.g., the entire book). Alternatively, to take into account what the reader has read so far K may be set to include all tokens in the set of words up to the current word being read. Other settings for the context window defined by K may be used depending on use case or performance tuning of language model 250.

Upon initiating reading module 230 and selecting content 240 to be displayed for reading, a first set of words from content 240 may be applied to language model 250 to identify words for highlighting. Words may be identified for highlighting if the likelihood value output by language model 250 for the particular word satisfies a specified threshold value. Highlighting generally refers to displaying identified words in a visually distinct manner relative to non-identified words. As noted above, words may be displayed in a different font, font size, color, boldness, underline, etc. The first set of words may correspond to a chapter or section of a book, a page, a paragraph, a sentence, or any unit by which content 240 may be broken into sets of words. After identifying one or more words from the first set of words using language model 250, the first set of words may be displayed to the reader for reading with the identified words highlighted to draw the focus of the reader.

Speech recognition module 260 comprises a computer program having one or more sequences of instructions or code together with associated data and settings. Upon executing the instructions or code, one or more processes are initiated to provide speech recognition of an audio recording. For example, the reader may read the first set of words of content 240 aloud while being recorded using electronic device 110. After the reader completes reading the first set of words aloud, speech recognition module 260 may be configured to perform speech recognition on audio recording 270 of the reader reading the first set of words aloud. The results of the speech recognition processing may be compared against the first set of words to determine which words were read aloud correctly and which words were read aloud incorrectly. Words may be considered to have been read aloud incorrectly if the reader mispronounces the word, reads the word as an entirely different word, emphasizes the wrong syllable, skips the word when reading, etc.

As the reader reads sets of words from content 240, language model 250 may continue to be trained to adapt to the experience of the particular reader. For example, the set of words read by the reader together with indications from speech recognition module 260 as to which words in the set of words were read aloud correctly and which words were read aloud incorrectly may form another training set with which language model 250 may continue to be trained for the particular reader.

After a set of words has been read by the reader and language model 250 has been trained based on which words from the read set of words were read correctly and which words were read incorrectly, the next set of words in content 240 may be applied to language model 250 to identify words from the next set of words for highlighting to draw the reader's focus. After the reader has read the next set of words, the adaptive process repeats with training language model 250 based on the most recently read set of words in preparation for a subsequent set of words to be displayed for the reader to read. This iterative process gradually fine tunes language model 250 to the reader's experience reading content 240 such that language model 250 may be applied to other content selected for reading by the reader.

In addition to highlighting words identified by language model 250 as expected to be difficult for a reader, language model 250 may be trained to highlight words that modify or provide context to the word expected to be difficult for the reader. The highlighted words may be a phrase including the word expected to be difficult along with adjective, adverbs, subjects, objects, etc. modifying or associated with the word. Language model 250 also might be trained to provide a definition for display with a word identified as expected to be difficult for a reader.

Image/drawing model 280 comprises a computer program having one or more sequences of instructions or code together with associated data and settings. Upon executing the instructions or code, one or more processes are initiated to select or create a drawing corresponding to a word applied to the model. For example, for a word identified by language model 250 as expected to be difficult for a reader, image/drawing model 280 may select an image from a set of images within content 240 that corresponds with the identified words and provide that image for display to the reader in proximity to the word. Instead of selecting the image from a set of images in content 240, image/drawing model 280 may highlight or emphasize all or a portion of an illustration already provided for display with the current set of words being displayed to the reader. Alternatively, image/drawing model 280 may be configured to search images outside of content 240 for an image corresponding to the identified word. The images may be in a local repository on the electronic device or may be found on a network or the Internet.

Image/drawing model 280 may be configured to create a drawing corresponding to a word identified by language model 250 and provide that drawing for display in proximity to the word. A specification may be provided by the creator of content 240 specifying characteristics of the drawings such as overall size, shape, colors, brush types, etc.

FIG. 3 depicts a set of words with examples of highlighting according to aspects of the subject technology. Passage 300 presented in FIG. 3 includes four different exemplary techniques for highlighting words. As depicted in FIG. 3, the words "flurry," jury-box," "upsetting," and "goldfish" are all presented in a larger font size than the other words in the passage. In addition, the words "flurry" and "goldfish" are underlined while the words "jury-box" and "upsetting" are in bold. The different treatment of the words may be used to communicate whether the words are expected to be difficult or familiar based on the reader's experience level. For example, increased size and underlining may be used to identify words expected to be difficult for the reader while increased size and bold may be used to identify words that the read has been exposed to before and therefore should be familiar with. Also depicted in FIG. 3 is image 310 selected by an image/drawing model as corresponding to the highlighted word "goldfish."

Figure 4:
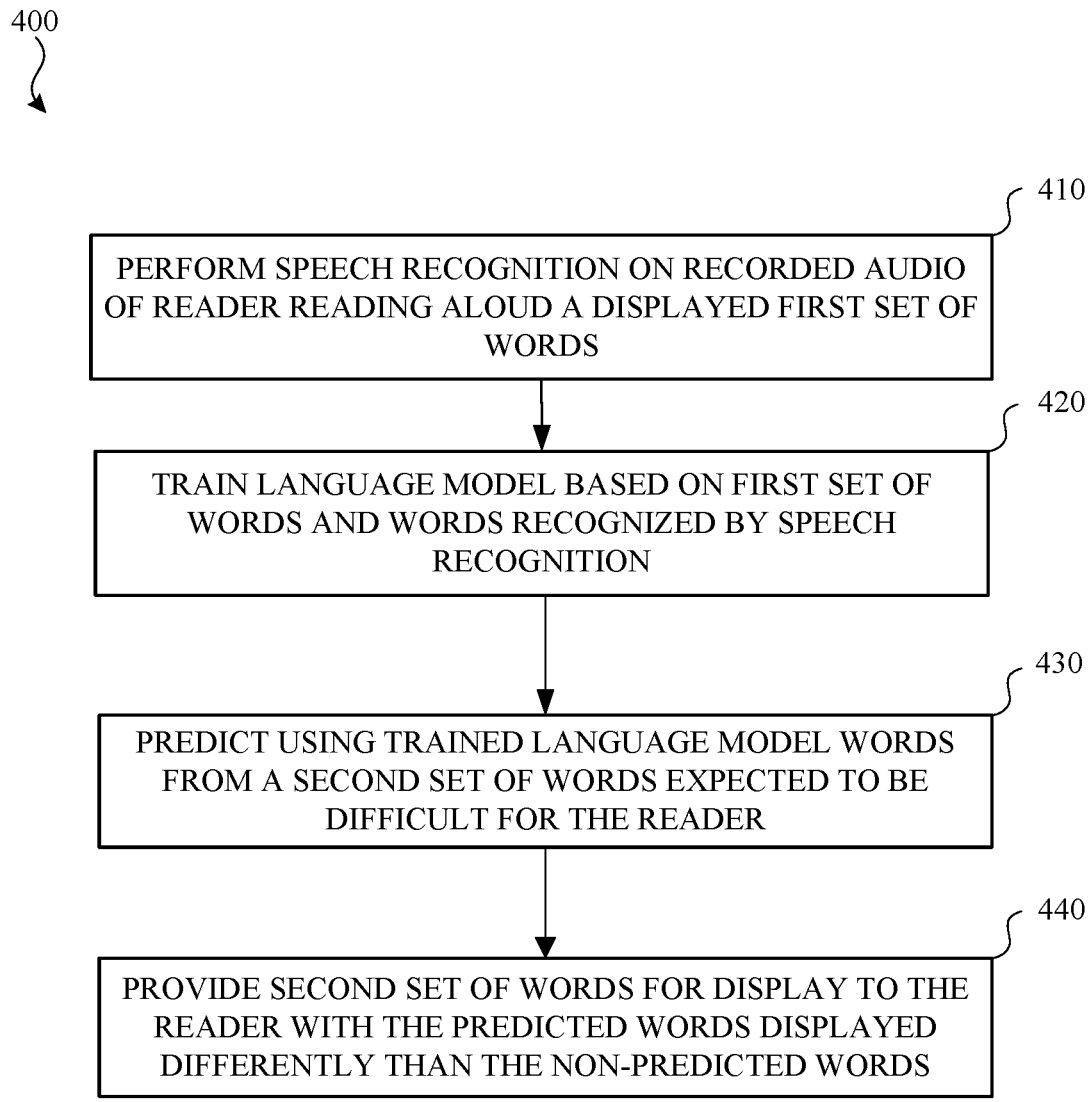
FIG. 4 illustrates an example process for selecting words for highlighting according to aspects of the subject technology.

FIG. 4 illustrates an example process for selecting words for highlighting according to aspects of the subject technology. For explanatory purposes, the blocks of process 400 are described herein as occurring in serial, or linearly. However, multiple blocks of process 400 may occur in parallel. In addition, the blocks of process 400 need not be performed in the order shown and/or one or more blocks of process 400 need not be performed and/or can be replaced by other operations.

Example process 400 may be initiated after a first set of words has been provided for display to a reader and the reader has read the first set of words aloud while recording the reading. After the reader has completed reading the first set of words aloud, speech recognition may be performed on the recorded audio of the reader reading the first set of words (block 410). Based on a comparison of the first set of words with the words or portions of words recognized by the speech recognition, a language model may be trained (block 420). Using the trained language model, one or more words from a second set of words are predicted as being expected to be difficult for the reader (block 430). The second set of words is then displayed to the reader with the predicted words displayed differently than the non-predicted words (block 440).

Figure 5:
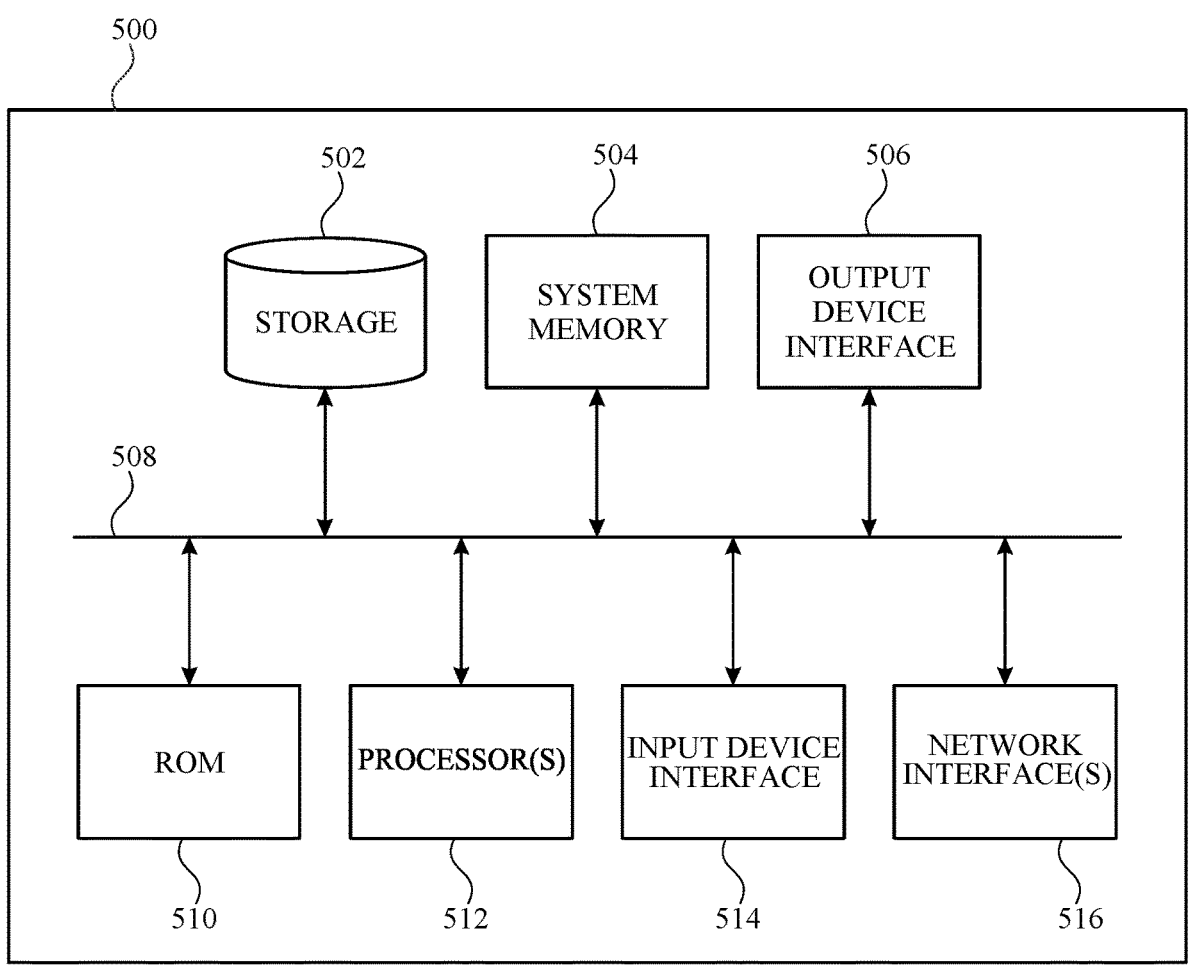
FIG. 5 illustrates an example electronic system with which aspects of the subject technology may be implemented.

FIG. 5 illustrates an electronic system 500 with which one or more implementations of the subject technology may be implemented. Electronic system 500 can be, and/or can be a part of, one or more of electronic devices 110, 120, and 130, or server 140 shown in FIG. 1. The electronic system 500 may include various types of computer readable media and interfaces for various other types of computer readable media. The electronic system 500 includes a bus 508, one or more processing unit(s) 512, a system memory 504 (and/or buffer), a ROM 510, a permanent storage device 502, an input device interface 514, an output device interface 506, and one or more network interfaces 516, or subsets and variations thereof.

The bus 508 collectively represents all system, peripheral, and chipset buses that communicatively connect the numerous internal devices of the electronic system 500. In one or more implementations, the bus 508 communicatively connects the one or more processing unit(s) 512 with the ROM 510, the system memory 504, and the permanent storage device 502. From these various memory units, the one or more processing unit(s) 512 retrieves instructions to execute and data to process in order to execute the processes of the subject disclosure. The one or more processing unit(s) 512 can be a single processor or a multi-core processor in different implementations.

The ROM 510 stores static data and instructions that are needed by the one or more processing unit(s) 512 and other modules of the electronic system 500. The permanent storage device 502, on the other hand, may be a read-and-write memory device. The permanent storage device 502 may be a non-volatile memory unit that stores instructions and data even when the electronic system 500 is off. In one or more implementations, a mass-storage device (such as a magnetic or optical disk and its corresponding disk drive) may be used as the permanent storage device 502.

In one or more implementations, a removable storage device (such as a floppy disk, flash drive, and its corresponding disk drive) may be used as the permanent storage device 502. Like the permanent storage device 502, the system memory 504 may be a read-and-write memory device. However, unlike the permanent storage device 502, the system memory 504 may be a volatile read-and-write memory, such as random access memory. The system memory 504 may store any of the instructions and data that one or more processing unit(s) 512 may need at runtime. In one or more implementations, the processes of the subject disclosure are stored in the system memory 504, the permanent storage device 502, and/or the ROM 510. From these various memory units, the one or more processing unit(s) 512 retrieves instructions to execute and data to process in order to execute the processes of one or more implementations.

The bus 508 also connects to the input and output device interfaces 514 and 506. The input device interface 514 enables a user to communicate information and select commands to the electronic system 500. Input devices that may be used with the input device interface 514 may include, for example, alphanumeric keyboards and pointing devices (also called "cursor control devices"). The output device interface 506 may enable, for example, the display of images generated by electronic system 500. Output devices that may be used with the output device interface 506 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 5, the bus 508 also couples the electronic system 500 to one or more networks and/or to one or more network nodes, such as the content provider 112 shown in FIG. 1, through the one or more network interface (s) 516. In this manner, the electronic system 500 can be a part of a network of computers (such as a LAN, a wide area network ("WAN"), or an Intranet, or a network of networks, such as the Internet. Any or all components of the electronic system 500 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

In accordance with the subject disclosure, a method is provided that includes predicting, using a language model, one or more words from a first set of words expected to be difficult for a reader, and providing the first set of words for display to the reader, wherein the predicted one or more words in the first set of words are displayed differently from non-predicted words in the first set of words.

The language model may correspond to a reading level of the reader. The method may further include performing speech recognition on recorded audio of the reader reading aloud the displayed first set of words and training the language model based on the displayed first set of words and words recognized from the first set of words by the speech recognition. The method may further include predicting, using the trained language model, one or more words from a second set of words expected to be difficult for the reader, and providing the second set of words for display to the reader, wherein the predicted one or more words in the second set of words are displayed differently from non-predicted words in the second set of words.

The method may further include comparing the words recognized by the speech recognition with the displayed first set of words, where the language model is trained based on the words recognized by the speech recognition that match words in the first set of words. The language model may be trained based on words in the first set of words that were not recognized by the speech recognition. The language model may be trained based on a frequency of words in the first set of words. The language model is trained based on a length of words in the first set of words. At least one word from the one or more words predicted in the second set of words may be different from the one or more words predicted in the first set of words.

The method may further include performing speech recognition on recorded audio of the reader reading aloud the displayed second set of words, and training the language model based on the displayed second set of words and words recognized from the second set of words by the speech recognition. The method may further include predicting, using the trained language model, one or more words from a third set of words expected to be difficult for the reader, and providing the third set of words for display to the reader, wherein the predicted one or more words in the third set of words are displayed differently from non-predicted words in the third set of words.

The predicted one or more words in the first set of words may be displayed with a different font, font size, color, or boldness than the non-predicted words in the first set of words. The method may further include providing for display to the reader an image corresponding to the one or more predicted words from the first set of words. The method may further include selecting, using in image model, the image from a set of images. The method may further include generating, using a drawing model, the image based on a specification.

In accordance with the subject disclosure, a non-transitory computer-readable medium storing instructions is provided which, when executed by one or more processors, cause the one or more processors to perform operations. The operations include performing speech recognition on recorded audio of the reader reading aloud a displayed first set of words, and training a language model based on the displayed first set of words and words recognized from the first set of words by the speech recognition. The operations further include predicting, using the trained language model, one or more words from a second set of words expected to be difficult for the reader, and providing the second set of words for display to the reader, wherein the predicted one or more words in the second set of words are displayed differently from non-predicted words in the second set of words.

The operations may further include comparing the words recognized by the speech recognition with the displayed first set of words, where the language model is trained based on the words recognized by the speech recognition that match words in the first set of words. The language model may be trained based on words in the first set of words that were not recognized by the speech recognition. The predicted one or more words in the second set of words may be displayed with a different font, font size, color, or boldness than the non-predicted words in the second set of words.

In accordance with the subject disclosure, a device is provided that includes a memory storing a plurality of computer programs, and one or more processors configured to execute instructions of the plurality of computer programs. When executed, the instructions predict, using a language model, one or more words from a first set of words expected to be difficult for a reader, and provide the first set of words for display to the reader, wherein the predicted one or more words in the first set of words are displayed differently from non-predicted words in the first set of words. The instructions further provide for display to the reader an image corresponding to the one or more predicted words from the first set of words.

The one or more processors, may be configured to execute instructions of the plurality of computer programs to select, using an image model, the image from a set of images. The one or more processors may be configured to execute instructions of the plurality of computer programs to generate, using a drawing model, the image based on a specification.

As described herein, aspects of the subject technology may include the collection and transfer of data from an application to other computing devices. The present disclosure contemplates that in some instances, this collected data may include personal information data that uniquely identifies or can be used to identify a specific person. Such personal information data can include demographic data, location-based data, online identifiers, telephone numbers, email addresses, home addresses, images, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used in highlighting content. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates implementations in which users selectively block the use of, or access to, personal information data. That is, the present disclosure contemplates that hardware and/or software elements can be provided to prevent or block access to such personal information data. For example, in the case of video conferencing, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   performing speech recognition on recorded audio of a reader reading aloud a displayed first set of words;
   training a machine learning language model based on the displayed first set of words and words recognized from the first set of words by the speech recognition;
   obtaining a second set of words to be displayed to the reader;
   predicting, using the machine learning language model, one or more words from the second set of words expected to be difficult for the reader by inputting the second set of words to the machine learning language model; and
   providing the second set of words for display to the reader, wherein the one or more words of the second set of words predicted to be difficult for the reader are displayed differently from other words of the second set of words that were not predicted to be difficult for the reader, wherein at least one word from the one or more words in the second set of words is different from the one or more words in the first set of words.

2. The method of claim 1, wherein the machine learning language model corresponds to a reading level of the reader.

3. The method of claim 1, further comprising:
   comparing the words recognized by the speech recognition with the displayed first set of words,
   wherein the machine learning language model is trained based on the words recognized by the speech recognition that match words in the first set of words.

4. The method of claim 3, wherein the machine learning language model is trained based on words in the first set of words that were not recognized by the speech recognition.

5. The method of claim 1, wherein the machine learning language model is trained based on a frequency of words in the first set of words.

6. The method of claim 1, wherein the machine learning language model is trained based on a length of words in the first set of words.

7. The method of claim 1, further comprising:
   predicting, using the machine learning language model, one or more words from a third set of words expected to be difficult for the reader; and
   providing the third set of words for display to the reader, wherein the one or more words of the third set of words predicted to be difficult for the reader are displayed differently from other words of the third set of words that were not predicted to be difficult for the reader.

8. The method of claim 1, wherein the one or more words of the second set of words predicted to be difficult for the reader are displayed with a different font, font size, color, or boldness than the other words of the second set of words.

9. The method of claim 1, further comprising providing for display to the reader an image corresponding to the one or more predicted words of the second set of words predicted to be difficult for the reader.

10. The method of claim 9, further comprising selecting, using in image model, the image from a set of images.

11. The method of claim 9, further comprising generating, using a drawing model, the image based on a specification.

12. A non-transitory computer-readable medium storing instructions which, when executed by one or more processors, cause the one or more processors to perform operations comprising:
    performing speech recognition on recorded audio of a reader reading aloud a displayed first set of words;
    training a machine learning language model based on the displayed first set of words and words recognized from the first set of words by the speech recognition;
    obtaining a second set of words to be displayed to the reader;
    predicting one or more words from the second set of words expected to be difficult for the reader by inputting the second set of words to the trained machine learning language model; and
    providing the second set of words for display to the reader, wherein the one or more words of the second set of words predicted to be difficult for the reader are displayed differently from other words in the second set of words that were not predicted to be difficult for the reader.

13. The non-transitory computer-readable medium of claim 12, wherein the operations further comprise:
    comparing the words recognized by the speech recognition with the displayed first set of words,
    wherein the machine learning language model is trained based on the words recognized by the speech recognition that match words in the first set of words.

14. The non-transitory computer-readable medium of claim 13, wherein the machine learning language model is trained based on words in the first set of words that were not recognized by the speech recognition.

15. The non-transitory computer-readable medium of claim 12, wherein the one or more words of the second set of words predicted to be difficult for the reader are displayed with a different font, font size, color, or boldness than the other words of the second set of words.

16. A device, comprising:
a memory storing:
a plurality of computer programs; and
one or more processors configured to execute instructions of the plurality of computer programs to:
perform speech recognition on recorded audio of a reader reading aloud a displayed first set of words;
train a machine learning model based on the displayed first set of words and words recognized from the first set of words by the speech recognition;
obtain a second set of words to be displayed to the reader;
predict, using the machine learning model, one or more words from the second set of words expected to be difficult for the reader by applying the second set of words to the machine learning model;
provide the second set of words for display to the reader, wherein the one or more words of the second set of words predicted to be difficult for the reader are displayed differently from other words of the first set of words; and
provide for display to the reader an image corresponding to the one or more words of the second set of words predicted to be difficult for the reader.

17. The device of claim 16, wherein the one or more processors are configured to execute instructions of the plurality of computer programs to select, using an image model, the image from a set of images.

18. The device of claim 16, wherein the one or more processors are configured to execute instructions of the plurality of computer programs to generate, using a drawing model, the image based on a specification.

19. The device of claim 16, wherein at least one of the one or more words of the second set of words predicted to be difficult for the reader are not included in the first set of words.

20. The non-transitory computer-readable medium of claim 12, wherein the operations further comprise providing for display to the reader an image corresponding to the one or more predicted words of the second set of words predicted to be difficult for the reader.

* * * * *

UNITED STATES PATENT AND TRADEMARK OFFICE
CERTIFICATE OF CORRECTION

| | | |
|---|---|---|
| PATENT NO. | : 12,272,261 B2 | Page 1 of 1 |
| APPLICATION NO. | : 17/874181 | |
| DATED | : April 8, 2025 | |
| INVENTOR(S) | : Daniel W. Busbridge et al. | |

It is certified that error appears in the above-identified patent and that said Letters Patent is hereby corrected as shown below:

On the Title Page

Under Item (72) Inventors: Replace "Letchworth Garden (GB)" with --Letchworth Garden City (GB)--.

Signed and Sealed this
Twenty-fourth Day of June, 2025

Coke Morgan Stewart
*Acting Director of the United States Patent and Trademark Office*